United States Patent [19]
Cho

[11] Patent Number: 6,145,921
[45] Date of Patent: Nov. 14, 2000

[54] SHOCK ABSORBING DEVICE FOR AUTOMOBILE PILLAR PANELS

[75] Inventor: Young Ik Cho, Ulsan-si, Rep. of Korea

[73] Assignee: Hyundai Motor Company, Seoul, Rep. of Korea

[21] Appl. No.: 09/123,503

[22] Filed: Jul. 28, 1998

[30] Foreign Application Priority Data

Aug. 30, 1997 [KR] Rep. of Korea ................. 97-45070

[51] Int. Cl.[7] ............................................ B60R 27/00
[52] U.S. Cl. ..................... 296/188; 296/39.1; 280/751
[58] Field of Search .................................. 296/188, 189, 296/39.1; 293/135; 280/751

[56] References Cited

U.S. PATENT DOCUMENTS

| | | | |
|---|---|---|---|
| 5,314,228 | 11/1999 | Figge, Sr. ............................ | 296/189 X |
| 5,795,013 | 8/1998 | Keller et al. ........................ | 296/188 |
| 5,938,273 | 8/1999 | Williams et al. .................... | 296/189 |
| 5,992,914 | 11/1999 | Gotoh et al. ........................ | 296/39.1 |
| 5,992,924 | 11/1999 | Noritake et al. .................... | 296/189 |

*Primary Examiner*—D. Glenn Dayoan
*Assistant Examiner*—Patricia Engle
*Attorney, Agent, or Firm*—Christie, Parker & Hale, LLP

[57] ABSTRACT

A shock absorbing device for automobile pillar panels, which effectively prevents damage of a chassis and protects passengers in the event of a car collision, is disclosed. The device comprises a plate spring structure provided between a pillar panel and a trim. The spring structure consists of a plurality of first and second curved plate springs, which are alternately arranged in the spring structure so as to be oppositely directed and meet each other at two junction points between neighboring springs. The first and second plate springs are integrated into a single structure at the junction points and are held by the pillar panel and the trim at their ends, respectively. The plate spring structure is preferably made of a plastic material through an injection molding process.

4 Claims, 2 Drawing Sheets

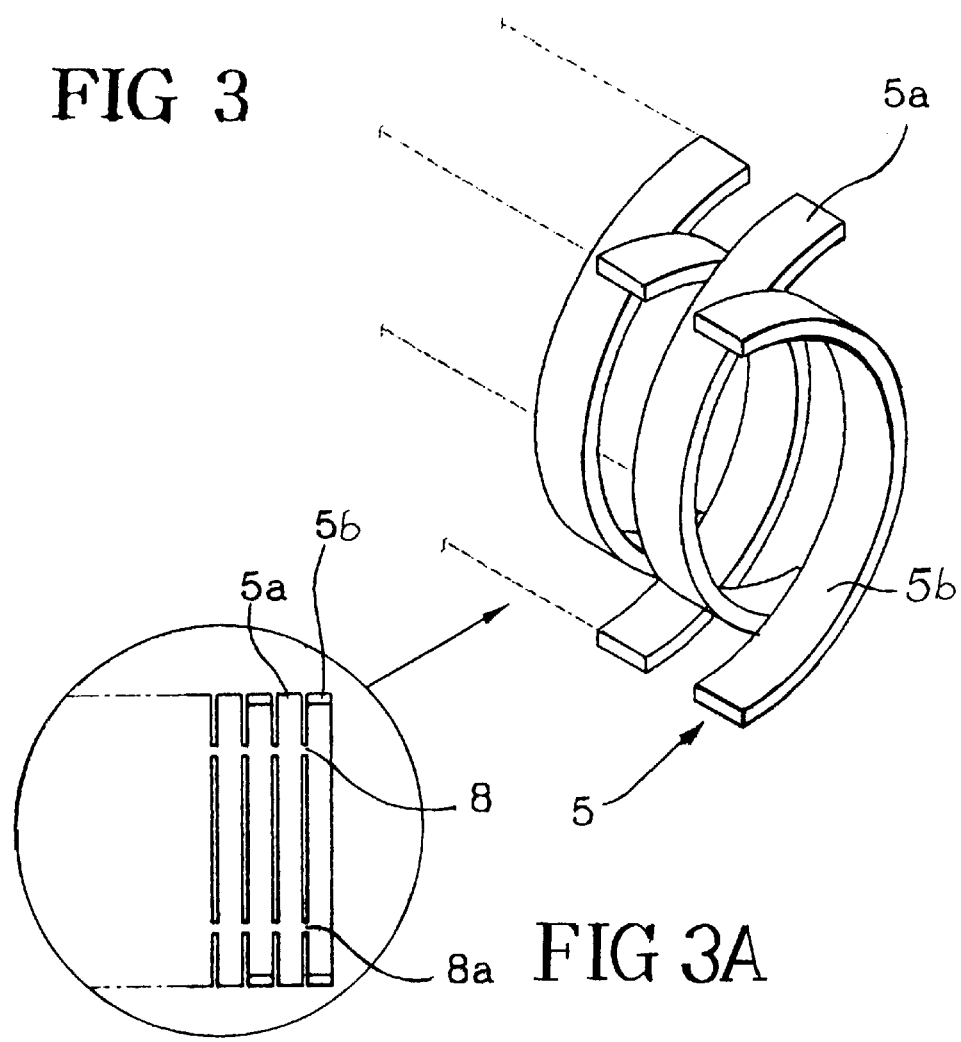
FIG 3
FIG 3A
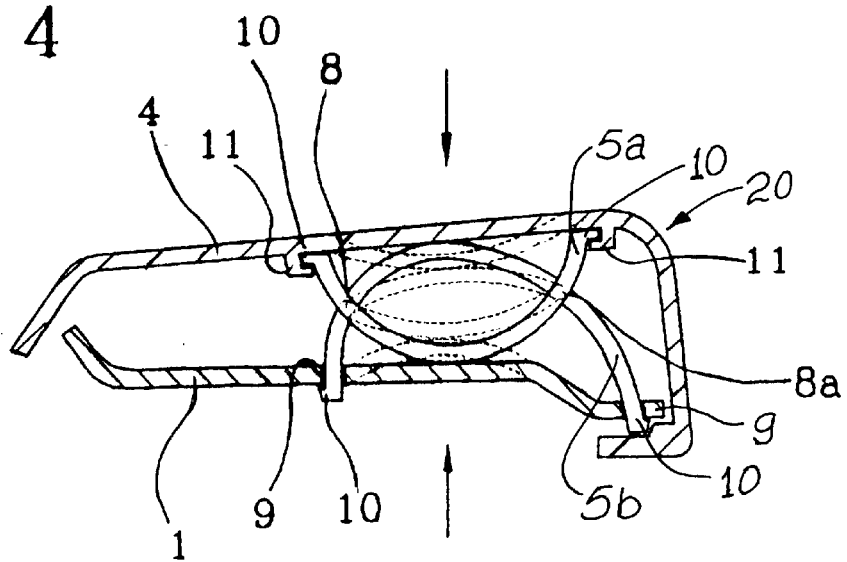
FIG 4

SHOCK ABSORBING DEVICE FOR AUTOMOBILE PILLAR PANELS

BACKGROUND OF THE INVENTION

1. Field of the Invention

The present invention relates, in general, to a shock absorbing device for automobile pillar panels and, more particularly, to a shock absorbing device including a shock absorbing plate spring structure at a position between a pillar panel and a trim coupled to the pillar panel or between the inner and outer pillar panel members of the pillar panel, thus effectively preventing damage of a chassis and protecting passengers in the event of a car collision.

2. Description of the Prior Art

As well known to those skilled in the art, vehicles are provided with various shock absorbing members for effectively absorbing the impact energy caused by a car collision, thus effectively preventing damage of the chassis and protecting passengers from such impact energy in the event of a car collision. That is, a plurality of synthetic resin trims are provided at the pillar panels installed at the front, rear and side frames of the chassis. The front and rear bumpers are individually and interiorly provided with a shock absorber. In addition, both the steering wheel and the side door are provided with air bags for protecting passengers from impact energy caused by a car collision. An impact beam is installed in each of the side doors, thus more effectively preventing damage of the chassis and protecting passengers from such impact energy.

When impact energy caused by a car collision is applied to the chassis, the head of a passenger may be inertially impacted by the trim of a pillar panel, thus being seriously injured. Therefore, in most nations of the world, it is prescribed in the automobile safety rules that when impact energy caused by a car collision is applied to the trim of a pillar panel, most of the impact energy has to be effectively absorbed by the trim, thus effectively protecting a passenger from such an impact energy. It is thus necessary to provide effective shock absorbing members at the pillar panels, thereby protecting passengers from such impact energy and meeting such a prescription of the safety rules.

However, known shock absorbing members for pillar panels, which are used for meeting such a prescription of the safety rules, are problematic in that they take up excessive space in an automobile and complicate the process of manufacturing automobiles and increase the manufacturing cost of the automobiles.

SUMMARY OF THE INVENTION

Accordingly, the present invention has been made keeping in mind the above problems occurring in the prior art, and an object of the present invention is to provide a shock absorbing device for automobile pillar panels, which is installed at a position between a pillar panel and a trim coupled to the pillar panel or between the inner and outer pillar panel members of the pillar panel, thus effectively preventing damage of a chassis and protecting passengers in the event of a car collision without requiring any additional shock absorbing members at the inside or outside of an automobile.

In order to accomplish the above object, the present invention provides a shock absorbing device for pillar panels, the pillar panels being provided at the front, rear and side frames of an automobile and being individually provided with a trim, comprising: a plate spring structure provided between a pillar panel and a trim of the pillar panel, the spring structure consisting of: a plurality of first and second curved plate springs alternately arranged in the spring structure so as to be oppositely directed and meet each other at two junction points between neighboring springs, the first and second plate springs being integrated into a single structure at the junction points and being held by the pillar panel and the trim at their ends, respectively.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a perspective view showing the configuration of a plate spring structure included in the shock absorbing device of this invention; and FIG. 3A is a partial side view of FIG. 3; and FIG. 4 is a sectional view showing the operation of the shock absorbing device of this invention.

DESCRIPTION OF THE PREFERRED EMBODIMENTS

Figure 1:
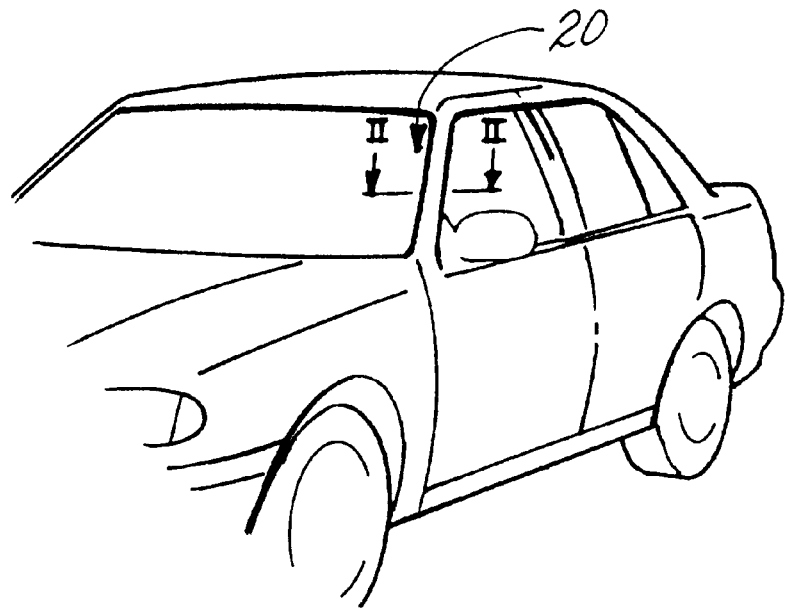
FIG. 1 is a perspective view of an automobile provided with a shock absorbing device for pillar panels in accordance with the present invention.
Figure 2:
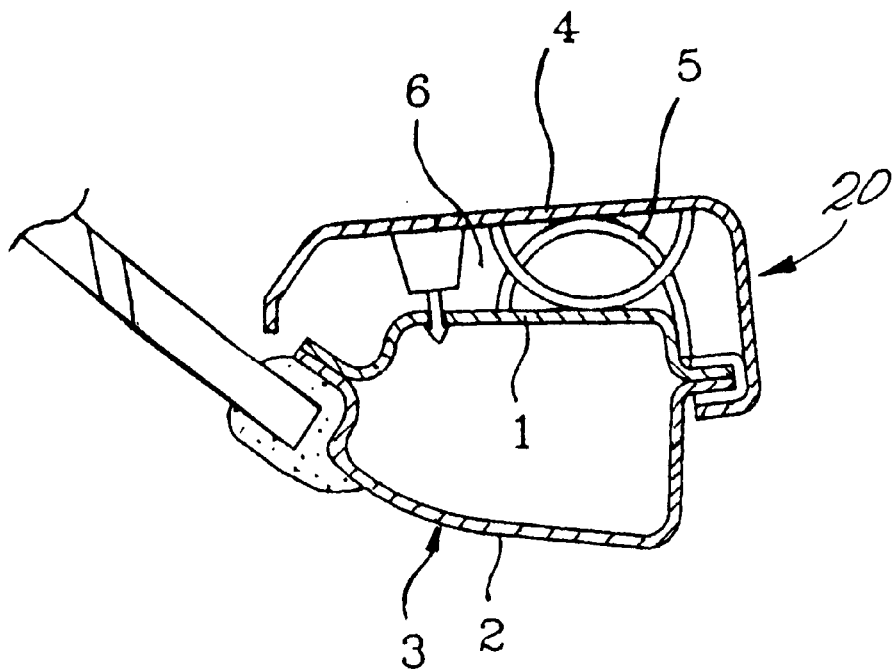
FIG. 2 is a sectional view taken along the line II—II of FIG. 1, showing the construction of the shock absorbing device of this invention.

FIG. 1 shows the position of a shock absorbing device 20 of this invention in an automobile. FIG. 2 shows the construction of the shock absorbing device 20. FIG. 3 shows the configuration of a plate spring structure included in the shock absorbing device. FIG. 4 shows the operation of the shock absorbing device 20.

As shown in the drawings, the shock absorbing device 20 of this invention is provided at a pillar panel 3, which is comprised of an inner pillar panel member 1 and an outer pillar panel member 2. An interior trim 4 is coupled to the pillar panel 3 from the interior of a passenger compartment of an automobile. The shock absorbing device 20 for pillar panels comprises a plate spring structure 5, which is installed in the trim 4. As shown in FIGS. 1 and 2, the pillar panel 3 is provided at each of the front, rear and side frames, thus providing a desired safety strength of a chassis. Such a pillar panel 3 is formed by integrating the inner and outer pillar panel members 1 and 2 into a single structure. The pillar panel 3 is covered with the trim 4 at the inside of the passenger compartment. In such a case, a gap 6 is defined between the pillar panel 3 and the trim 4, thus receiving the plate spring structure 5 of this invention. The plate spring structure 5 is comprised of a plurality of first and second curved plate springs 5b and 5a, which are alternately arranged in the spring structure 5 so as to be oppositely directed and meet each other at two junction points 8 and 8a between neighboring springs 5b and 5a. The first and second plate springs 5b and 5a are integrated into a single structure at the junction points 8 and 8a and are held by the pillar panel 3 and the trim 4 at their ends, respectively. The plate spring structure 5, with the above configuration, effectively absorbs impact energy applied from the pillar panel 3 to the trim 4 in the event of a car collision. The spring structure 5 also allows both the pillar panel 3 and the trim 4 to elastically recover their original configuration when the impact energy is removed. In the preferred embodiment of this invention, each of the first and second plate springs 5*b* and 5*a* has an arcuate configuration as shown in the drawings.

The first and second plate springs 5*b* and 5*a* individually have a fitting flange 10 at each end, thus being fitted into holding means 9, 11 of both the pillar panel 3 and the trim 4. That is, the pillar panel 3 has two fitting holes each forming holding means 9, while the trim 4 has two fitting channels each forming holding means 11.

The plate spring structure 5 is made of a plastic material through an injection molding process. The spring structure 5 thus effectively absorbs impact energy.

The operational effect of the above shock absorbing device will be described hereinbelow in conjunction with FIG. 4.

In the event of a car collision, impact energy is applied to the pillar panel 3, thus pushing the plate springs 5*b*, 5*a* of the structure 5 as shown by the phantom line of FIG. 4. The impact energy is thus effectively absorbed by the springs 5*b*, 5*a*. In such a case, the head of a passenger may inertially collide against the trim 4 and so the passenger may be impacted on his head. However, the impact energy is effectively absorbed by the plate spring structure 5, thus protecting the head of the passenger. When the impact energy is removed, the plate springs 5*b* and 5*a* are elastically returned to their original configuration, thus allowing both the pillar panel 3 and the trim to elastically recover their original configuration.

In the preferred embodiment, the plate spring structure 5 is installed in the gap 6 between the pillar panel 3 and the trim 4. However, such a spring structure may be installed in a bumper or between inner and outer panels of a side door. In such a case, the spring structure more effectively absorbs impact energy, thus preventing damage of a chassis and protecting passengers in the event of a car collision.

As described above, the present invention provides a shock absorbing device for automobile pillar panels. The device comprises a plate spring structure, which is installed at a position between a pillar panel and a trim or between the inner and outer pillar panel members of the pillar panel. The plate spring structure thus effectively prevents damage of a chassis and protects passengers in the event of a car collision without requiring any additional shock absorbing members at the inside or outside of an automobile.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A shock absorbing device for pillar panels, said pillar panels being provided at the front, rear and side frames of an automobile and being individually provided with a trim, comprising:

a plate spring structure provided between the pillar panels and the trim of the pillar panels, said spring structure consisting of:
   a plurality of first and second curved plate springs alternately arranged in the spring structure so as to be oppositely directed and meet each other at two junction points between the neighboring springs, said first and second plate springs being integrated into a single structure at the junction points and being held by the pillar panel and the trim at their ends, respectively.

2. The shock absorbing device according to claim 1, wherein said plate spring structure is made of a plastic material through an injection molding process.

3. The shock absorbing device according to claim 1, wherein each of said first and second plate springs has an arcuate configuration.

4. The shock absorbing device according to claim 1, wherein each of said first and second plate springs has a fitting flange at each end, thus being fitted into holding means of each of the pillar panel and the trim.

* * * * *